April 29, 1969   D. T. O'SHEA   3,440,662
GOGGLES
Original Filed July 26, 1965

INVENTOR.
DONALD T. O'SHEA
BY
*Richard R. Walling*
ATTORNEY

United States Patent Office 3,440,662
Patented Apr. 29, 1969

3,440,662
GOGGLES
Donald T. O'Shea, 12970 Lake Ave.,
Lakewood, Ohio 44107
Continuation of application Ser. No. 474,608, July 26, 1965. This application Jan. 8, 1968, Ser. No. 696,480
Int. Cl. A61f 9/02, 9/04
U.S. Cl. 2—14                                   1 Claim

ABSTRACT OF THE DISCLOSURE

A safety goggles construction including, a pair of eyecups joined by a nose-piece and including a head-encircling band for retaining the goggles on the head of a wearer. Each of the eyecups is formed of relatively soft and flexible opaque material and each eyecup includes a deeply recessed sight opening and a forwardly disposed annular outwardly extending frame flange encircling the opening. Two lenses are operatively disposed in the sight opening and a resilient snap ring is adapted to fit over the frame flange on each eyecup to retain the lenses in operative position within the sight opening. Each sight opening also includes an annular lens seat formed circumferentially entirely within the opening and disposed at the inner end thereof for receiving the lenses thereagainst. The lens seat has at least three resilient upstanding flat tabs disposed circumferentially around and formed integral with the lens seat, such tabs being disposed within and at the bottom of the lens opening for receiving the lenses in resilient cushioning relation thereon. Each of the tabs is positioned radially on the lens seat with respect to the centerline of the opening and perpendicular to the circumference of the opening and dimensioned to fold over circumferentially on the seat when predetermined pressure is applied by the lenses and snap ring.

---

This application is a continuation of applicant's co-pending application Ser. No. 474,608, filed July 26, 1965, titled, Goggles, now abandoned.

This invention relates to safety goggles and more particularly to that type of safety goggles worn for oxy-acetylene welding or cutting and to safety goggles for grinding, chipping and scaling metals.

Goggles are especially useful when they can be used for different applications. However, in adapting the goggles from one application to another, a quick change of lenses is usually required. For example, clear vision protection is required for grinding, chipping and scaling metals, while protection from bright illumination is essential in welding operations. Prior art teaches the use of goggles or other eye protective devices which embody single lenses suitable for limited use only and also devices which are constructed and arranged with combinations of lenses movable into and out of the field of vision of the wearer. In the latter instance, the lens supporting portions of the devices generally form a relatively inseparable part of each device, thus requiring the devices to be marketed as complete units, such units being heavy and bulky. In other of the prior art devices, interchangeability of lenses is achieved by retaining the lens in position in the goggle eyecup by means of a threaded lens retaining ring threaded to the exterior of the eyecup.

In all prior art devices, not only has the changing of lenses proved to be a cumbersome and time-consuming operation, but, in most instances, the lenses are not retained securely and tightly in position in the eyecups, particularly when a plurality of lenses are removed from each eyecup and replaced by a single lens for a different application. Additionally, there has not been a satisfactory air vent formed integral with the goggles which prevents sparks and foreign matter from entering the goggles and which provides adequate ventilation interiorly thereof.

Therefore, it is an object of the invention to provide a pair of safety goggles wherein the lens or lenses therein may be changed by a quick and simple operation.

A further object of the invention is to provide safety goggles of the above type having a lens seat means in the eyecups which function to securely and tightly retain one or more lenses in operative position within the eyecup.

A further object of the invention is to provide safety goggles of the above type having air vents which provide adequate ventilation interiorly of the goggles, yet positively prevent the entry of sparks and foreign matter thereinto.

Briefly, the foregoing objects are accomplished by the provision of safety goggles wherein one or more lenses are retained in operative position in the lens receiving bore of each eyecup by means of a flexible, resilient, snap-type, retaining ring configured for being flexed and pulled over into position over the front exterior portion of the eyecup. In each eyecup, the lens is positioned on a recessed annular shoulder or lens seat formed in the lens receiving bore in the forward portion of the eyecup, said lens seat being recessed deep enough within the eyecup to receive a plurality of lenses therein. The lens seat has a series of upstanding resilient projections or seating tabs formed circumferentially around the seat and extending upwardly therefrom whereby the innermost lens (if a plurality of lenses is used) seats against such resilient tabs, thereby forming a highly resilient seat or cushion for receiving the lens or lenses in snug operative position in the eyecup.

In practice, one or more lenses of various thicknesses are placed within the lens receiving bore portion of the eyecup and against the resilient seating tabs on the bore seat. Next, the resilient, snap-type, retaining ring of the invention is flexed and positioned over the forward portion of the eyecup (which is configured to receive the same) in operative position such that the snap-ring maintains a bias on the outer circumferential edge of the lens or lenses against said seating tabs to firmly hold the lens or lenses in the eyecup.

Disposed in the side of each eyecup housing is an air vent of off-set construction including a hollow cylindrical housing portion positioned in the eyecup and an exterior off-set lid or cap portion spaced from the housing portion and attached thereto by a plurality of circumferentially spaced studs or legs. With this construction, an adequate passageway for flow of air therethrough is provided, yet foreign matter striking the exposed exterior portion of the vent from any angle cannot enter the same.

Other objects and advantages of the invention will be apparent from the following description taken in conjunction with the drawings wherein.

Figure 1:
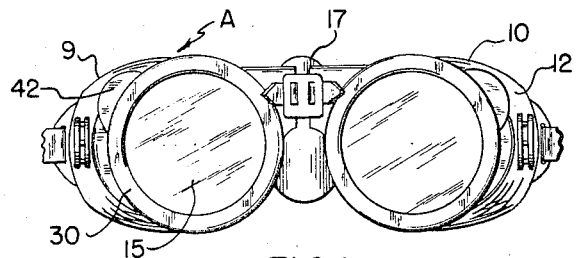
FIG. 1 is a front elevational view of a pair of safety goggles shown in FIG. 1 and showing the relative position

Although the invention is shown and described herein with reference to semi-coverall type safety goggles, it will be understood that it may be applied to any type of goggles, protective or otherwise.

Referring to the drawings, there is shown a pair of safety goggles, generally designated as A constructed in accordance with the invention and comprising a pair of spaced, one-piece, left and right eyecups or eyecup housings 9 and 10. Since, for the purposes of the invention the eyecups are identical, the structure of only one will be described herein in detail.

Each eyecup is formed with a face engaging rear edge 11 shaped to the general contour of the eye-encircling portions of the face and an annular front portion 12 having a sight opening in the form of a recessed cylindrical lens receiving aperature or bore 13 for receiving one or more lenses, such as the filter lens 14 and the cover lens 15. The eyecups have a suitable headband 16 secured thereto in a conventional manner to hold the goggles in position on a wearer's face. The eyecups are connected centrally by a conventional bridge member or nose piece 17. Disposed in the side of each eyecup housing is an air vent 18 to be hereinafter described. The eyecup housings may be formed of any suitable resilient opaque material, although, in the preferred form, a thermoplastic type of material such as polyvinyl chloride may be used.

Figure 2:
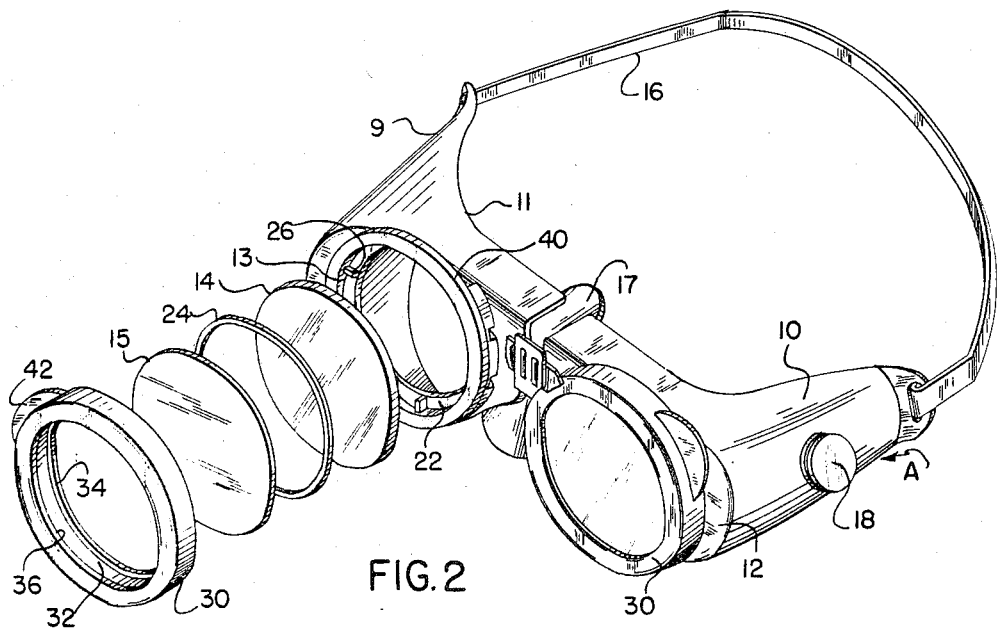
FIG. 2 is an exploded perspective view of the safety goggles shown in FIG. 1 and showing the relative position of the parts thereof prior to assembly.
Figure 3:
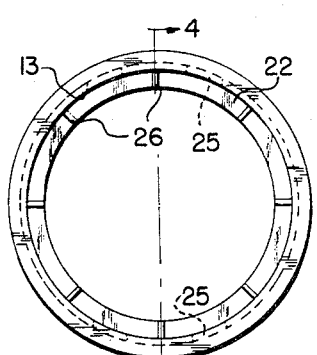
FIG. 3 is an enlarged, portional front elevational view of the lens seat formed in each eyecup of the safety goggles shown in FIG. 1.
Figure 4:
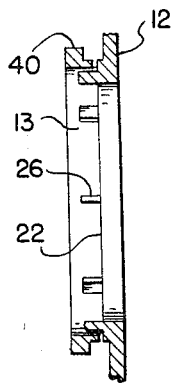
FIG. 4 is a sectional view taken along the line 4—4 of FIG. 3.

As aforementioned, each eyecup housing has a lens-receiving cylindrical bore 13 formed therein, said bore terminating in a recessed annular shoulder or lens seat 22. The bore 13 is deep enough to accommodate a plurality of lenses 14 and 15, as shown in FIG. 2, together with the annular spacer ring 24. Also, the bore may receive a single lens of substantial thickness as is required in certain applications. A series of ventilating slots or elongated apertures 25 (FIG. 3) may be formed aruond the periphery of the 13 for additional ventilating means.

The lens seat 22 contains a series of upstanding projections or tabs 26 formed circumferentially around the seat and extending upwardly therefrom for receiving the lens or lenses thereagainst. The tabs 26 are resilient to the extent that they partially flex or bend when a lens is pressed longitudinally thereagainst.

The lenses 14 and 15, and their spacer ring 24 therebetween, are secured in position in the lens receiving bore 13 (and against the tabs 26) by means of the annular resilient snap-type retaining ring 30. The shaft 32 of the snap ring 30 contains spaced outer flanges 34 and 36 at the respective ends thereof. The flange 34 is adapted to fit over the eyecup housing flange 40 in coaction therewith to snugly retain the snap ring 30 on the eyecup housing. In such position, the flange 36 fits over the peripheral edge of the outermost lens 15 to retain the lenses 14 and 15 (and spacer ring 24) in operative position within the eyecup. In practice, the snap ring 30 is adapted to be flexed or stretched to fit over the flange 40 of the eyecup housing, said snap ring having a gripping tab 42 for ease in thus applying the ring to the eyecup.

With this construction, lenses may be changed in the goggles by a quick and simple operation simply by stretching the snap ring 30 over the eyecup flange 40, such lenses being retained in operative position in the goggles by a secure, snug fit.

Also, if the goggles should be dropped, the lens breakage is substantially prevented because of the recessed lens seat construction in coaction with the snap ring 30 aforedescribed. Additionally, this construction avoids thread-freezing of screw cap rings common in prior art structures.

The present construction also permits front insertion of the lens (or lenses) into the eyecup. More specifically, with the snap cap 30 in position on the eyecup, the lens may be quickly inserted through the ring 30 and slipped under the resilient snap ring flange 36 for positioning in the eyecup, there being ample clearance of the bore 13, the lens seat 22 and the flange 36 to effect such front insertion method. In fact, the snap cap 30 could be formed integral with the eyecup whereby said front insertion method of the lenses would be the main means for positioning the lenses in the eyecup.

Figure 5:
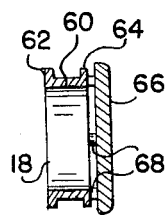
FIG. 5 is an enlarged side elevational sectional view of one of the air vents shown in the eyecup housings of the safety goggles shown in FIG. 1.

Referring now to FIG. 5, disposed in the side of the eyecup housing is the air vent 18 for admitting air interiorly of the goggles. The vent 18 contains a hollow cylindrical housing portion 60 having the end flanges 62 and 64, thus enabling the vent to be positioned snugly in an aperture in the eyecup housing as shown. Spaced from the vent housing 60 is an offset lid or cap portion 66 attached to the housing by the legs 68. This construction provides more than adequate ventilation, yet substantially prevents foreign matter from entering the vent.

The terms and expressions which have been employed are used as terms of description, and not of limitation, and there is no intention, in the use of such terms and expressions, of excluding any equivalents of the features shown and described or portions thereof, but it is recognized that various modifications are possible within the scope of the invention claimed.

What is claimed is:

1. A safety goggles construction including, a pair of eyecups joined by a nose-piece and including a head-encircling band for retaining the goggles on the head of a wearer, each of said eyecups being formed of relatively soft and flexible opaque material and each including a deeply recessed sight opening and a forwardly disposed annular outwardly extending frame flange encircling the opening, at least two lenses operatively disposed in the opening, a resilient snap ring adapted to fit over the frame flange on each eyecup to retain the lenses in operative position within the opening, each sight opening also including an annular lens seat formed circumferentially entirely within the opening and disposed at the inner end thereof for receiving the lenses thereagainst, said lens seat having at least three relatively soft resilient upstanding elongated thin wafer-like rectangular planar flat tabs disposed circumferentially around and formed integral with the seat only and disposed within and at the bottom of the lens opening for receiving said lenses in resilient cushioning relation thereon, each of said tabs being positioned radially on the lens seat with respect to the centerline of the opening and perpendicular to the circumference of the opening and dimensioned to fold over circumferetially on the seat when predetermined pressure is applied thereto by the lenses and snap ring, said snap ring comprising a shaft portion flanked by a pair of inwardly extending spaced end flanges, one of said end flanges being adapted to fit over said frame flange in coaction therewith to detachably secure the snap ring to the eyecup, said snap ring having a gripping tab for ease in applying the ring to the eyecup, said snap ring being detachably secured to said frame flange to retain the lenses snugly in position in the eyecup sight opening in coaction with said tabs, and an annular spacer ring disposed between said lenses.

References Cited

UNITED STATES PATENTS

| | | | |
|---|---|---|---|
| 1,679,105 | 7/1928 | Tully et al. | 2—14.7 |
| 1,886,410 | 11/1932 | Malcolm. | |
| 2,301,018 | 11/1942 | Clark. | |
| 2,351,358 | 6/1944 | Miner. | |
| 2,589,439 | 3/1952 | Seidel | 2—14.7 |
| 2,727,237 | 12/1955 | Malcolm | 2—14.7 |
| 3,259,909 | 7/1966 | Wood. | |

HERBERT F. ROSS, *Primary Examiner.*

U.S. Cl. X.R.

128—141; 351—41